United States Patent [19]

Ishikawa

[11] Patent Number: 4,856,417
[45] Date of Patent: Aug. 15, 1989

[54] TRUNK PISTON FOR USE IN AN INTERNAL COMBUSTION ENGINE

[75] Inventor: Yoshikazu Ishikawa, Chofu, Japan

[73] Assignee: Nissan Motor Company, Limited, Yokohama, Japan

[21] Appl. No.: 703,657

[22] Filed: Feb. 21, 1985

Related U.S. Application Data

[63] Continuation of Ser. No. 492,372, May 6, 1983, abandoned.

[30] Foreign Application Priority Data

May 27, 1982 [JP] Japan .............................. 57-78166[U]

[51] Int. Cl.$^4$ .............................................. F16J 1/04
[52] U.S. Cl. .................................... 92/233; 123/193 P
[58] Field of Search ................. 92/126, 187, 208, 209, 92/222, 225–230, 233, 237, 232, 172; 29/156.5 R; 123/193 P; 403/150–152

[56] References Cited

U.S. PATENT DOCUMENTS 1,514,022  11/1924  Smith ............................... 92/209 X

FOREIGN PATENT DOCUMENTS 57-81143  5/1982  Japan .............................. 123/193 P Primary Examiner—Edward K. Look
Attorney, Agent, or Firm—Foley & Lardner, Schwartz, Jeffery, Schwaab, Mack, Blumenthal & Evans

[57] ABSTRACT

A piston comprises a piston crown section, a piston skirt section connected to the piston crown section and having a pair of relatively flat, inclined portions at a pair of radially opposite locations thereof and a pair of piston pin boss sections disposed through and connected to the inclined portions of the piston skirt section, respectively, with the distance between the inclined portions being decreased from the maximum at the upper portion of the piston skirt section to the minimum at the lower portion of the piston skirt section.

8 Claims, 3 Drawing Sheets

TRUNK PISTON FOR USE IN AN INTERNAL COMBUSTION ENGINE

This is a continuation of application Ser. No. 492,372, filed May 6, 1983, now abandoned.

BACKGROUND OF THE INVENTION

The present invention relates to an internal combustion engine for a vehicle, more particularly to a cylindrical trunk piston for use in the engine.

Generally, in internal combustion engines for a vehicle such as automobiles, pistons are made of an aluminum alloy, one of the light alloy metals, to reduce the weight thereof, thereby reducing the vibration of the engine.

In a conventional internal combustion engine, a trunk type piston 10 as shown in FIGS. 1 and 2 comprises a piston crown section 12, a pair of piston pin boss sections 14, a piston skirt section 6, etc. integrally formed in an aluminum alloy casting. Some examples of such pistons are described in "AUTOMOBILE ENGINEERING HANDBOOK—new edition—", 1970, by Automobile Technology Institute, pages 4 to 20.

An aluminum alloy having a small specific gravity is used to reduce the weight of the piston 10 as described above. In addition, the excellent heat conductive property of the aluminum alloy is effective to reduce the temperature of the piston crown section 12 (particularly, the piston head section which forms a part of the combustion chamber). Thus, there is an advantage that the knocking-resistant property is improved.

However, since the coefficient of thermal expansion of the aluminum alloy is larger than that of iron, as the temperature of the piston 10 changes depending upon the driving condition of the engine, the dimension of the piston 10 also changes. This results in a drawback that the sliding gap between the piston 10 and the cylinder (not shown) largely changes. More specifically, if the piston 10 is formed such that its diameter is smaller than a predetermined value to provide a gap enough to accomodate the thermal expansion of the piston during operation at high temperatures, the gap will become very large when the temperature of the piston 10 is low. Consequently, the piston slap (side pressure sound) will increase.

Accordingly, the piston 10 in the prior art has the following construction to keep a desired constant sliding gap between the piston 10 and the cylinder.

The piston skirt section 16 serves to guide the piston 10 sliding in the cylinder. This piston skirt section 16 has a generally oval cross section. As the temperature rises, the piston crown section, exposed to the relatively higher temperature in the combustion chamber, thermally expands, which is followed by the expansion of the thick piston pin boss section 14, so that the piston skirt section 16 pulled by the boss section 14 is deformed. The thin piston skirt section 16 itself also expands due to heat. The deformation of the piston skirt section pulled by the boss section and the thermal expansion of the piston skirt section are well balanced by design in order to keep the above-mentioned sliding gap constant.

The temperature in the piston skirt section 16 generally decreases longitudinally along the axis of the piston from the upper portion 18 to the lower portion 22 (refer to FIG. 2) during driving of the autmobile. Therefore, the piston skirt section 16 is tapered to keep the expansion of the piston skirt section uniform; more specifically, the lateral cross section of the upper portion 18 of the piston skirt section 16 is smaller than that of the lower portion 22 so that the difference in thermal deformation between the upper and lower portions 18 and 22 is suitably adjusted on the basis of the difference in temperature of the both portions.

Incidentally, the term lateral is intended to indicate the direction orthogonal to the longitudinal axis of the piston 10.

The conventional piston construction as described above has a drawback that since the temperatures in the upper and lower portions 18 and 22 of the piston skirt section 16 vary largely depending upon the driving state, the thermal expansion and deformation also change during operation, and therefore it is impossible to keep the gap between the cylinder and the upper portion 18 constant throughout the driving of the automobile.

While the piston is operated under a relatively low load, in other words, when the piston temperature is relatively low, the piston skirt section 16 does not deform enough and keeps substantially its tapered shape, so that the gap between the cylinder and the upper portion 18 of the piston skirt section 16 is left large. Hence, the piston 10 vibrates or swings in the cylinder, which results in the increased piston slap. The improper reciprocating operation of the piston ring causes the oil consumption and the amount of blow-by gas to increase.

A primary object of the present invention is therefore to provide a trunk piston for use in an internal combustion engine in which the gap between the cylinder and the piston can be kept small, so that the piston slap is reduced.

Another object of the present invention is to provide a trunk piston for use in an internal combustion engine in which the oil consumption and the amount of blow-by gas are reduced.

SUMMARY OF THE INVENTION

Briefly described, these and other objects of the present invention are accomplished by the provision of an improved piston which comprises a piston crown section, a cylindrical piston skirt section connected to the piston crown section and having a pair of relatively flat, inclined portions at a pair of radially opposite locations thereof and a pair of piston pin boss sections disposed through and connected to the inclined portions of the piston skirt section respectively, the outer periphery of each of the piston boss sections being connected to the inclined portion of the piston skirt section and the distance or span between the inclined portions decreasing from the maximum at the upper portion to the minimum at the lower portion of the piston skirt section.

BRIEF DESCRIPTION OF THE DRAWINGS

These and other objects, features and advantages of the present invention will be more apparent from the following description of a preferred embodiment, taken in conjunction with the accompanying drawings, in which.

DETAILED DESCRIPTION OF THE PREFERRED EMBODIMENT

Figure 1:
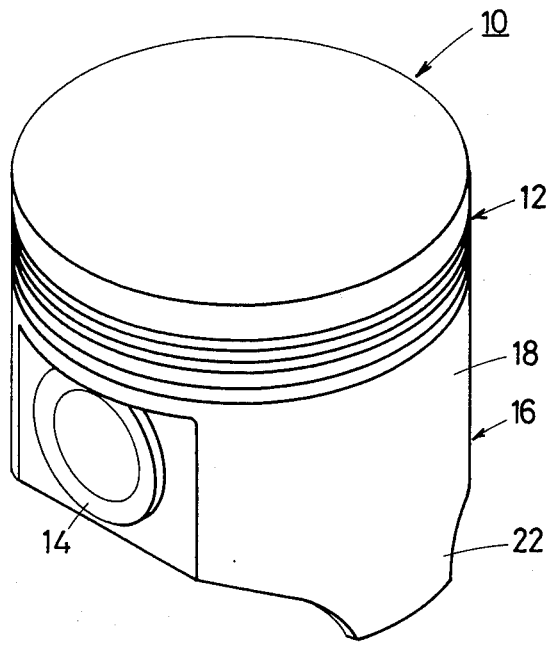
FIG. 1 is a perspective view of a conventional piston.
Figure 2:
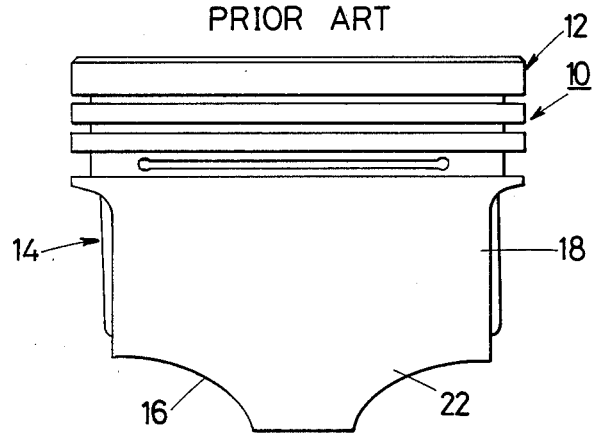
FIG. 2 is a side elevational view of the piston shown in FIG. 1.
Figure 3:
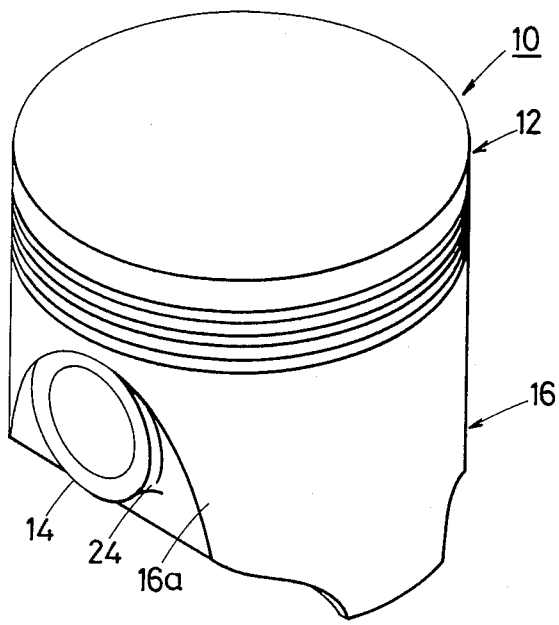
FIG. 3 is a perspective view of the piston to which the present invention is employed.
Figure 4:
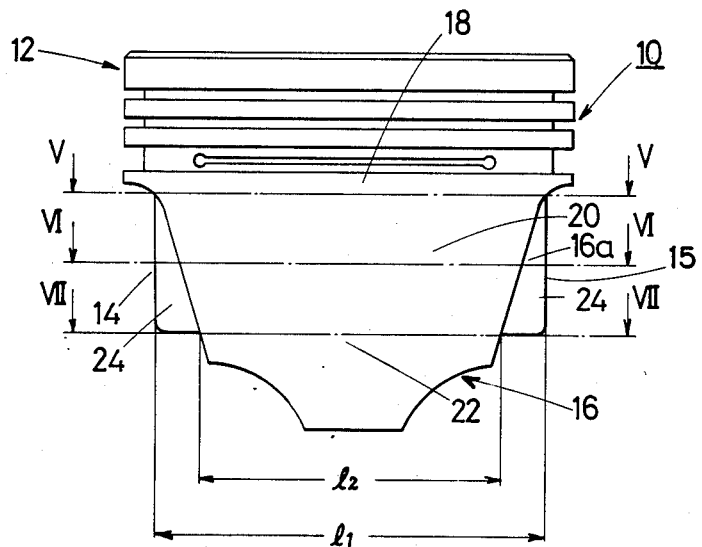
FIG. 4 is a side elevational view of the piston shown in FIG. 3.

Referring now to FIGS. 3 and 4, there is generally indicated at 10 an embodiment of a piston which is made from a casting aluminum alloy. The piston 10 has a piston crown section 12, a piston skirt section 16 connected to the piston crown section 12 and a pair of inclined flat portions at a pair of radially opposite locations thereof and a pair of piston pin boss sections 14 disposed through and connected to the inclined flat portions of the piston skirt section, respectively.

The piston skirt section 16 is laterally symmetrically formed with respect to the axial line extending through the piston pin boss sections 14 as shown in FIG. 3. The outer periphery 24 of each piston pin boss section 14 is connected to the relatively flat inclined portion 16a of the skirt portion 16. It will be noted in FIG. 4 that the outer edge 15 of the piston pin boss section 14 is at the upper most portion thereof positioned on the surface of the portion 16a. Each pin boss section also has an inner periphery 17 and an inner edge part 19. The inner edge part 19 is spaced apart from the flat inclined portion 16a by a distance which decreases from an upper position of the pin boss section to a lower position of the pin boss section. The vertical cross section of the skirt portion including the axis extending through the piston boss sections is trapezoidal in shape, wherein the term vertical is intended to indicate the direction parallel to the axis of the piston. In other words, the span of the piston skirt section 16 is relatively large at the upper portion 18 (the maximum distance between the inclined portions is indicated by 1 as shown in FIG. 4). The span of the piston skirt section at the intermediate portion is shorter than at the upper portion 18, and at the lower portion 22 is further shorter than at the intermediate portion 20 (the minimum distance between the inclined portions is indicated by 1 as shown in FIG. 4).

Figure 5:
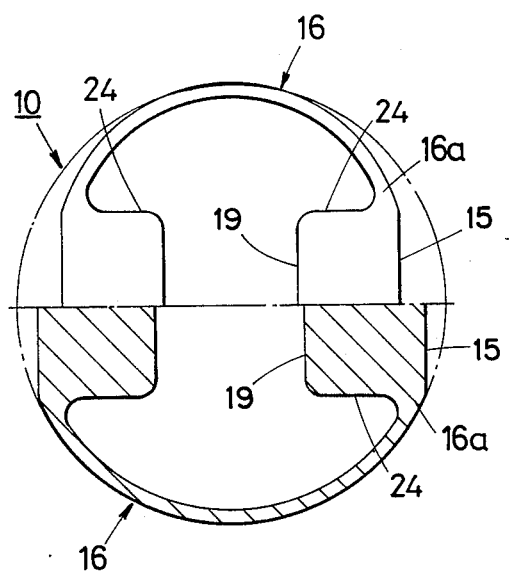
FIG. 5 is a schematic cross sectional view taken along the line V—V of FIG. 4.
Figure 6:
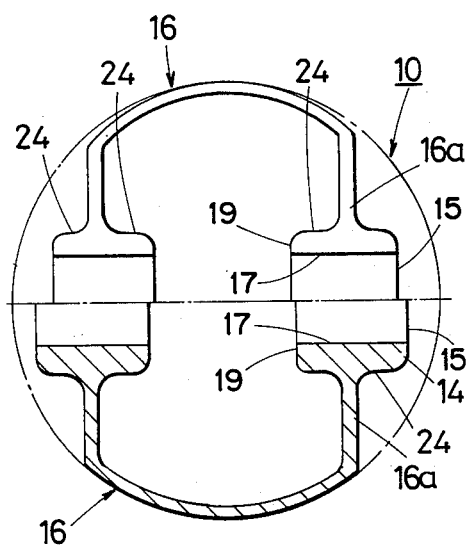
FIG. 6 is a schematic cross sectional view taken along the line VI—VI of FIG. 4.
Figure 7:
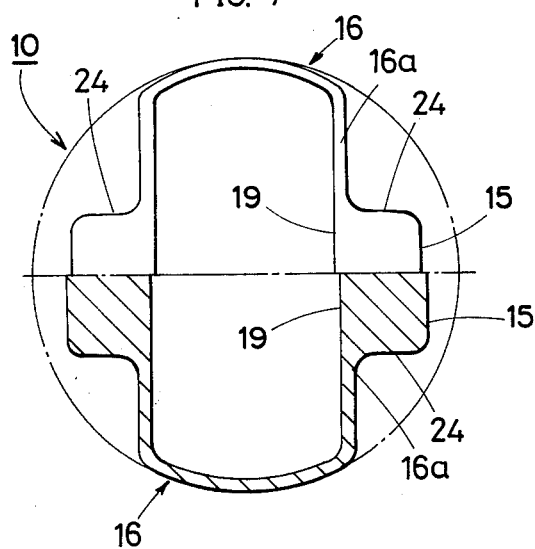
FIG. 7 is a schematic cross sectional view taken along the line VII—VII of FIG. 4.

The function of the piston in accordance with this embodiment will be described hereinafter with reference to FIGS. 5 to 7, wherein the upper half of each drawing shows a half of the piston in lateral cross section at a lower temperature and the lower half shows a half of the piston in lateral cross section at a higher temperature.

While the engine is working, the temperature of the piston 10 rises. As previously mentioned, the upper portion 18 of the piston skirt section 16 is connected at the inclined portion thereof to the outer periphery 24 of each of the piston pin boss sections 14 at the uppermost portion thereof such that the span of the upper portion 18 or the distance between the inclined portions is relatively large at the upper portion 18. Hence, in the event where the piston pin boss section 14 largely deforms in the axial direction of a piston pin (not shown) due to thermal expansion, this deformation occurs such that it offsets the expansion of the upper portion 18 of the skirt section 16 in the direction perpendicular to the axial direction of the piston pin. Consequently, the dimension (the diameter of the skirt) of the upper portion 18 of the above-mentioned piston skirt section 16 is kept substantially constant during operation (refer to FIG. 5).

On the other hand, as already described above, the intermediate portion 20 of the piston skirt section 16 is connected to the outer periphery 24 of the piston pin boss sections 14 at the vertically intermediate portion thereof wherein the surface of the portion 16a is positioned at a location inset from the outer edge of the piston pin boss section. The span of the intermediate portion 20 is smaller than that of the upper portion 18. Thus, the above-mentioned deformation of the piston pin boss section 14 due to thermal expansion is inherently small, whereby a substantially constant dimension can be likewise maintained during operation (refer to FIG. 6).

The lower portion 22 of the piston skirt section 16 is connected to the outer periphery 24 of the piston pin boss section 14 at the lowermost portion thereof wherein the surface of the portion 16a is positioned at a location further inset from the outer edge of the piston pin boss section. Therefore, the span of the lower portion 22 is further smaller than that of the intermediate portion. It will be noted that this portion is less affected by the thermal expansion of the piston pin boss portion 14 and it is possible to keep a substantially constant dimension with a small amount of offsetting (refer to FIG. 7).

As described above, according to the present invention, it is possible to keep the dimension (skirt diameter) of the piston skirt section substantially constant throughout from the upper portion 18 to the lower portion 22 of the piston skirt section 16 in any driving conditions. Therefore, there is no need to provide a large gap between the cylinder and the piston for accomodating thermal expansion. It is possible to make the piston skirt section 16 with an optimum dimension.

Furthermore, it may be possible to provide the piston skirt section 16 with a smooth taper having a small angle to the vertical direction in response to the temperature gradient of the piston skirt section. The dimensions of the upper and lower portions of the piston skirt section can be always kept substantially constant irrespective of the driving condition of the engine. Therefore, the gap between the cylinder and the piston can be kept small, so that piston slap is reduced. In addition, the oil consumption and the amount of the blow-by gas are reduced.

Although a preferred embodiment of the invention is specifically illustrated and described herein, it will be appreciated that many modifications and variations of the present invention are possible in light of the above teachings and within the purview of the appended claims without departing from the spirit and intended scope of the invention.

What is claimed is:

1. A trunk piston for use in an internal combustion engine comprising:

a piston crown section;

a piston skirt section comprising a cylindrical part attached to the crown section and a pair of flat parts which are opposite to and inclined with respect to each other;

a pair of piston pin boss sections each having an outer edge part and an outer periphery, said boss sections being attached to the flat parts of the skirt section such that each flat part is positioned at a location inset from the outer edge of an associated pin boss section, said inset extent increasing from an upper position of the associated pin boss section to a lower position of the associated pin boss section.

2. A trunk piston according to claim 1, wherein said outer edge of the piston pin boss section includes an uppermost portion which is positioned on the flat part of the piston skirt section.

3. A trunk piston according to claim 2, wherein each piston pin boss section includes an inner edge having a lowermost portion portion which is positioned on the flat part of the associated piston skirt section.

4. A trunk piston according to claim 1, wherein said piston consists of an aluminum alloy.

5. A trunk piston according to claim 1, wherein the vertical cross section of said piston skirt section including an axis extending through said piston pin boss sections is trapezoidal in shape.

6. A trunk piston according to claim 1, wherein each flat part of the piston skirt is positioned at a location inset from an inner edge of one of the piston pin boss sections, the inset extent decreasing from an upper portion to a lower portion.

7. A trunk piston for use in an internal combustion engine comprising:
a piston crown section;
a piston skirt section comprising a cylindrical part attached to the crown section and a pair of flat parts which are opposite to and inclined with respect to each other;
a pair of piston pin boss sections each having an inner edge part and an inner periphery, said boss sections being attached to the flat parts of the skirt section such that each flat part is positioned spaced apart from the inner edge part of an associated pin boss section, the distance between said inner edge part and said flat part decreasing from an upper position of the associated pin boss section to a lower position of the associated pin boss section.

8. A trunk piston for use in an internal combustion engine comprising:
a piston crown section;
a piston skirt section comprising a cylindrical part attached to the crown section and a pair of flat parts which are opposite to and inclined with respect to each other such that the distance between said inclined flat parts decreases from a maximum at an upper portion of said piston skirt section to a minimum at a lower portion of said piston skirt section;
a pair of piston pin boss section disposed through and attached to said flat parts of said skirt section;
wherein said piston skirt section includes curved portions connecting said flat parts, said curved portions being generally oval and being forced outwardly by expansion of said piston pin boss sections in response to heat, said inclination of said flat parts being such that said curved portions are forced to take on a generally cylindrical configuration in response to expansion of said pin boss sections due to non-uniform heating of said piston caused by heat generated in said internal combustion engine.

* * * * *